F. LOUVRIER.
ELECTROMETALLURGICAL FURNACE.
APPLICATION FILED DEC. 18, 1909.
989,169.
Patented Apr. 11, 1911.
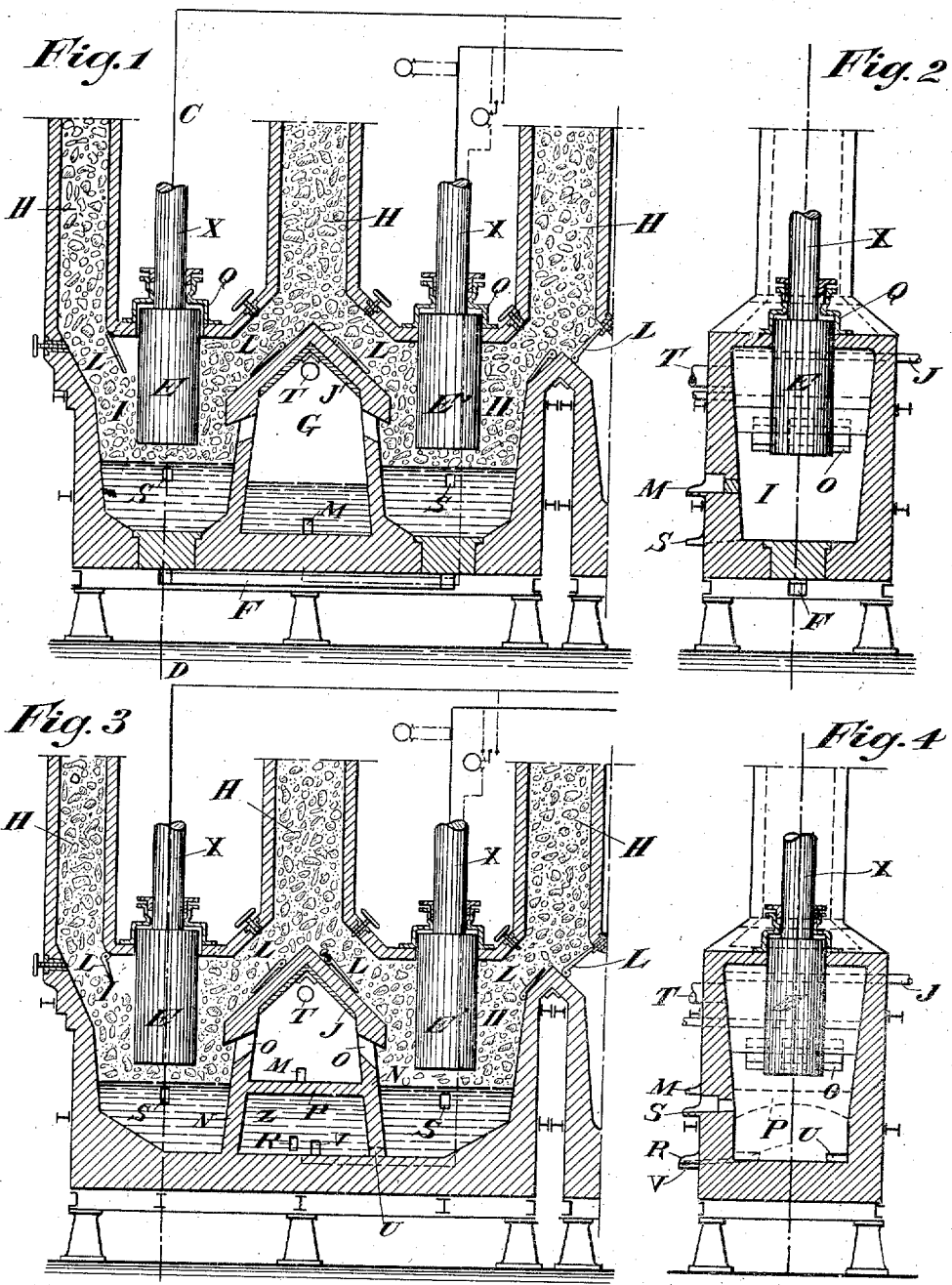
Witnesses:
L. A. Gauvin
E. J. Gauvin
FRANÇOIS LOUVRIER Inventor
By Marion & Marion
Attorneys

UNITED STATES PATENT OFFICE.

FRANÇOIS LOUVRIER, OF MEXICO, MEXICO.

ELECTROMETALLURGICAL FURNACE.

989,169. Specification of Letters Patent. Patented Apr. 11, 1911.

Application filed December 18, 1909. Serial No. 533,861.

*To all whom it may concern:*

Be it known that I, FRANÇOIS LOUVRIER, a citizen of the Republic of France, residing at Mexico, Mexico, have invented certain new and useful Improvements in Electrometallurgical Furnaces; and I do hereby declare that the following is a full, clear, and exact description of the invention, such as will enable others skilled in the art to which it appertains to make and use the same.

The invention to be hereinafter described relates to electrometallurgical furnaces, and particularly to the general class of such furnaces especially adapted for the reduction of zinc ore and of metallic ores which are volatile at their reducing temperatures.

Broadly speaking, it comprises a furnace body divided into reduction and condensing chambers, means for delivering the volatile metallic vapors from the reducing to the condensing chamber, means for feeding ore to the reducing chambers, means for heating the ore to volatilize it, and means for cooling the volatile metallic vapors.

In order to more clearly disclose the construction, operation and use of the invention, reference should be had to the accompanying drawings forming part of the present application.

Throughout the several figures of the drawings, like reference characters designate the same parts.

In the drawings: Figure 1 is a vertical longitudinal section through a preferred form of furnace for reduction of simple zinc ores; Fig. 2 is a cross section on line C—D of Fig. 1; Fig. 3 is a view similar to Fig. 1, showing a furnace for reduction of complex zinc ores; and, Fig. 4 is a central vertical cross section through reduction chamber I of Fig. 3.

Referring to the drawings in detail, and particularly to Figs. 1 and 2, the furnace as a whole is formed with a plurality of reduction chambers I and II, adapted to receive zinc ores through the feeding columns H, which may be closed or cut off from the chambers by gates L, as shown at the right in Fig. 1. The walls of the reduction chambers are slightly tapered, so that they converge inwardly as they approach the bottom of the furnace, and the floors of the chambers are made of an electrically conductive material and are electrically connected one with the other through an outside conductor F. The walls of the reducing chambers are formed of refractory material not susceptible of entering into reaction with the treated metal and slags. Between the reducing chambers, is placed the condensing chamber G, provided with passages O for the entrance thereinto of the zinc vapors generated in the reduction chambers I and II. The roof of each condensing chamber is peaked, and its lower edges project outwardly beyond the upright walls of the chamber. The openings O are made through the upright walls at points directly below the projecting edges of the roof, and are guarded thereby, so that no ore can get into and obstruct the passages O. On referring to Fig. 1, it will be seen that the ore fed through the column H, falls directly onto the top of the condensing chamber G. The furnaces can be laid one against the other with the object of decreasing the number of feeding columns. In order to heat the ore to reducing temperature, adjustable electrodes E and E', secured to iron rods X, are mounted in stuffing boxes, which form parts of covers Q, secured to the furnace roof around the electrode openings. These electrodes may be raised or lowered by any well known mechanism. A group of shunted electrodes may be substituted for the single electrodes, if desired. The electrodes are in circuit with the current used for reduction of the ores, the complete active circuit including also the floors of the reduction chambers, the conductor F and the ores in the reducing chambers I and II. In order to facilitate condensation of the vapors, a water jacket J or other contrivance can be used on the interior of the condensing chamber, the jacket being adapted to maintain this chamber at a temperature just slightly above that of liquefaction of the metal. In some instances, it is possible that some of the vapors may remain uncondensed in the chamber G. Such vapors may pass from the chamber G by way of the passage T. The slag may be withdrawn from the reduction chambers through spouts S, and the condensed metal may be withdrawn from the condensing chamber G through the spout M.

The operation of this preferred form of the furnace is as follows: Ore is fed into the reducing chambers I and II through the loading columns H, by opening the gates L, and the electrodes E and E' are adjusted vertically to establish a current which will pass from one electrode through the ore in one reducing chamber, out through the conductor F, and up through the material in the other reducing chamber, completing the circuit through the other electrode. As the current passes through the zinc ore in the reducing chambers, the heat generated will melt the ore and volatilize the zinc. The volatilized zinc and other gases will rise in the reduction chambers. As these gases rise, the less dense ones will filter upward through the granular charge, giving it a preliminary heating. The volatilized zinc being much denser, will not filter through the granular charge, but will be forced to pass through the openings O to the interior of the condensing chamber G. Here they are cooled to liquefaction by the jacket J, and any uncondensed vapors may pass from the chamber G by way of the tube T. As rapidly as the charge is reduced and condensed, it is drawn off through the spouts M and S, thus rendering the furnace absolutely continuous.

When the zinc ores are complex and contain such additional metals as lead, copper, silver, etc., a modified form of furnace is used, as shown in Figs. 3 and 4. This modified form is similar to the preferred form for pure zinc ores, except that the condensing chamber is somewhat differently constructed, and the smelting current is conducted from one electrode to the other in a somewhat different manner, the floors of the reduction chambers being made of a non-electrically conductive material. The condensing chamber G, in the modified form, is divided into two compartments, by a horizontal partition P. The upper compartment forms the condensing chamber proper, while the lower compartment forms a crucible Z for the reception of the melted non-volatile metals, which flow into it through passages U made in the lower part of the crucible walls N, in order to prevent the prolonged contact of the reduced metals with the reduction slag. The entire contents of the crucible may be withdrawn through the spout V, but a thin conducting layer may be left upon the floor in order that the electric current may pass from one electrode to the other through the reducing chambers. This layer is obtained by using the spout R placed just a few millimeters above the floor of the furnace.

Suitable meters of known form may be used to indicate the amount and the tension of the electric current.

It is clear that changes may be made in the construction, arrangement and disposition of the several parts of the invention, without in any way departing from the field and scope of the same, and it is meant to include all such within this application, wherein only preferred forms have been disclosed.

Having thus fully described my invention, what I claim as new and desire to secure by Letters Patent, is:—

1. A furnace of the character described comprising a furnace body, a condensing chamber built up within the furnace body in such manner as to divide the interior thereof into two separate and distinct reduction chambers, and provided with openings through the upper parts of its walls to allow inflow of volatilized metals from the reduction chambers; means for charging the reduction chambers, and means for reducing the charge.

2. A furnace of the character described comprising a furnace body, a condensing chamber built up within the furnace body in such manner as to divide the interior thereof into two separate and distinct reduction chambers, and provided with openings through the upper parts of its walls to allow inflow of volatilized metals from the reduction chambers; an electricity conductor arranged in the bottom of each reduction chamber, a conductor connecting the same, means for charging the reduction chambers, and means for passing a current through the charges and through the conductors to reduce the charge.

3. A furnace of the character described comprising a furnace body, a condensing chamber built up within the furnace body in such manner as to divide the interior thereof into two separate and distinct reduction chambers, and provided with openings through the upper parts of its walls to allow inflow of volatilized metals from the reduction chambers; cooling means mounted within said condensing chamber and adapted to condense the volatile metals, means for charging the reduction chambers, and means for reducing the charge.

4. A furnace of the character described comprising a furnace body, a condensing chamber built up within the furnace body in such manner as to divide the interior of the furnace body into two separate and distinct reduction chambers, and provided with openings through the upper parts of its walls to allow inflow of volatilized metals from the reduction chambers, and also provided with an escape passage for non-condensed vapors; cooling means mounted within said condensing chamber and adapted to condense the volatile metals, means for charging the reduction chambers, and means for reducing the charge.

5. A furnace of the character described comprising a furnace body, a condensing chamber built up within the furnace body in such manner as to divide the interior of the furnace body into two separate and distinct reduction chambers, and provided with openings through the upper parts of its walls to allow inflow of volatilized metals, means for guarding said openings against entrance of solids during operation of the furnace, means for charging the reduction chambers, and means for reducing the charge.

6. A furnace of the character described comprising a furnace body, a chamber built up within the furnace body in such manner as to divide the interior of the furnace body into two separate and distinct electrically connected reduction chambers, and provided with upper and lower openings through its walls for inflow of volatilized metals and reduced non-volatilized metals, respectively, from said reduction chambers; a partition dividing the aforesaid built up chamber into a condensing chamber and a crucible chamber, means for charging said reducing chambers, and means for passing an electric current through said charge and through said reduction and said crucible chambers.

In witness whereof I have hereunto set my hand in the presence of two witnesses.

FRANÇOIS LOUVRIER.

Witnesses:
  LEON DOMINIAN,
  G. A. GUERRA.